April 12, 1938.  H. A. CURTIS  2,113,574

MAKING CALCIUM METAPHOSPHATE

Filed Aug. 17, 1935

HARRY A. CURTIS
INVENTOR

BY Arthur L. Davis
ATTORNEY

Patented Apr. 12, 1938

2,113,574

UNITED STATES PATENT OFFICE 2,113,574

MAKING CALCIUM METAPHOSPHATE

Harry A. Curtis, Knoxville, Tenn.

Application August 17, 1935, Serial No. 36,672

8 Claims. (Cl. 23—108)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a process of making calcium metaphosphate from certain calcium compounds and phosphorus pentoxide, and particularly to a process in which conditions are so controlled that only calcium metaphosphate is produced.

One of the objects of this invention is to provide a continuous method and an efficient means for the production of calcium metaphosphate. Another object of this invention is to produce calcium metaphosphate substantially free from other phosphates. Still another object of this invention is to provide for the control of the temperature in the reaction zone when the products of combustion of elemental phosphorus are treated to remove their phosphorus pentoxide content. Other objects of this invention include the provision for the control of the temperature in the reaction zone when the products of combustion of a phosphorus reduction furnace gas are treated to remove their phosphorus pentoxide content.

I have discovered a continuous process for the treatment of elemental phosphorus or phosphorus reduction furnace gases containing the same, which consists in oxidizing all of the elemental phosphorus and then contacting the hot, gaseous mixture countercurrently with a calcium compound which is reactive with phosphorus pentoxide to form calcium mataphosphate with control of the temperature in the reaction zone by admitting a sufficient quantity of inert gas so that the flame temperature is maintained substantially above the melting point of the calcium metaphosphate formed and below the melting point of calcium pyrophosphate, so that calcium pyrophosphate and other higher melting compounds or mixtures will not be fused. A substantially pure calcium metaphosphate is formed under these conditions.

Figure 1:
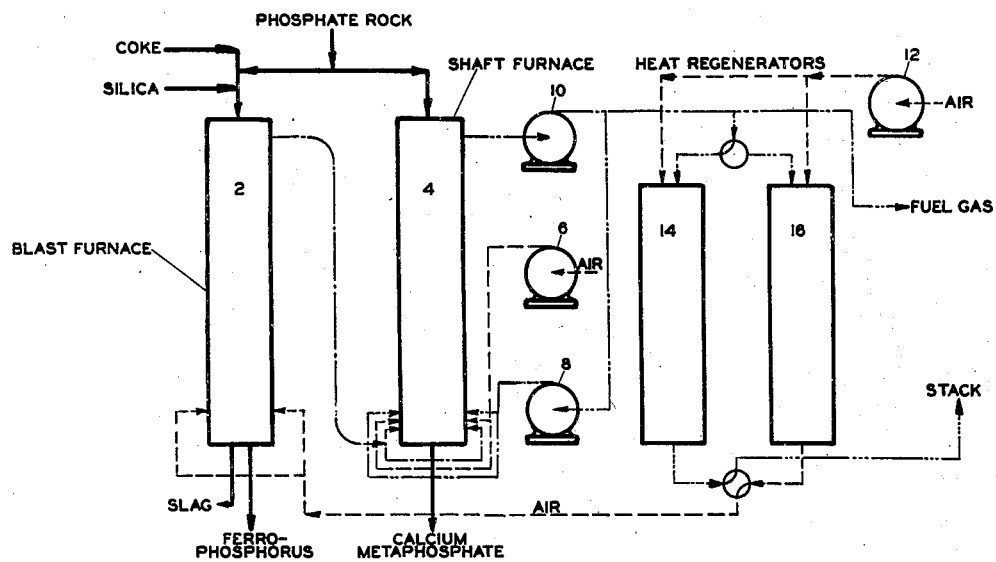
Figure 2:
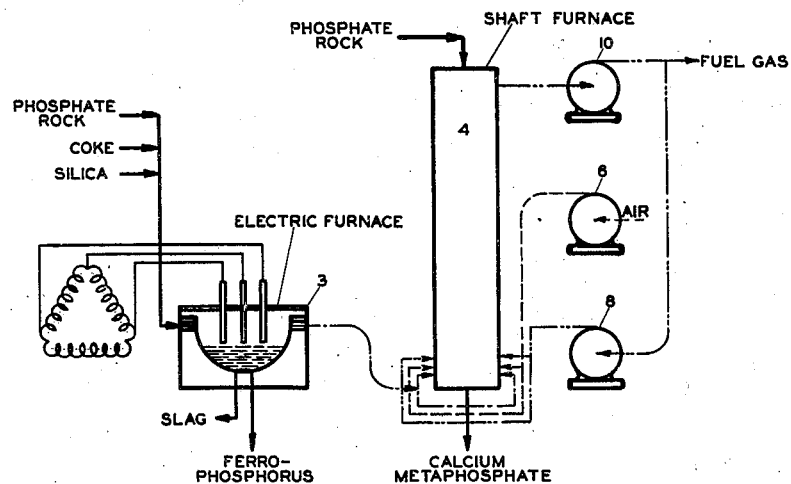

In the accompanying drawing, which forms a part of the specification, and wherein the reference symbols refer to like parts whenever they occur, Fig. 1 is a diagrammatic, vertical, sectional view of one form of apparatus for the embodiment of my process in which the phosphorus reduction furnace gas is produced in a blast furnace, and Fig. 2 is a diagrammatic, vertical, sectional view of another form of apparatus for the embodiment of my process in which the phosphorus reduction furnace gas is produced in an electric furnace.

In Fig. 1, a mixture of phosphate rock, coke and silica is charged into the top of blast furnace 2, in which the charge is heated to the proper reaction temperature by the admission of preheated air through a plurality of tuyèrs located in the shell of the blast furnace at an elevation immediately above the furnace hearth. Slag and ferrophosphorus are withdrawn from the bottom of furnace 2, and the gaseous mixture of phosphorus reduction furnace gas, comprised of phosphorus, carbon monoxide and nitrogen, is withdrawn from the top of furnace 2. Phosphate rock is charged into the top of shaft furnace 4, and is heated to the point of fusion of calcium metaphosphate, but below the temperature at which calcium pyrophosphate melts, by admitting the phosphorus reduction furnace gas from furnace 2, only a sufficient amount of air supplied by blower 6, to oxidize the phosphorus and a small proportion of the carbon monoxide in the gas from the blast furnace 2, and only a sufficient quantity of an inert gas supplied by blower 8, to maintain the temperature of the combustion products sufficiently below the melting point of calcium pyrophosphate to prevent any substantial contamination of the calcium metaphosphate formed, to a plurality of burners located in the shaft furnace 4, at an elevation immediately above the hearth of the furnace. The melt produced in the shaft furnace 4, which is comprises substantially of calcium metaphosphate, is withdrawn from the hearth of shaft furnace 4, and a gaseous mixture, which is a fuel gas, comprised of carbon monoxide, carbon dioxide and nitrogen is withdrawn from near the top of shaft furnace 4, by blower 10, which serves to maintain a substantially atmospheric pressure at the top of blast furnace 2. A portion of the fuel gas delivered by blower 10, is used to supply the inert gas to blower 8, and another portion of the fuel gas delivered by blower 10, with air delivered by blower 12, is burned alternately in a plurality of heat regenerators 14 and 16, respectively, for preheating the air required for the operation of blast furnace 2. The combustion products from heat regenerators 14 and 16 pass to a stack.

In Fig. 2, a mixture of phosphate rock, coke and silica is charged into the top of electric furnace 3, in which the charge is heated to the proper reaction temperature by the electrical current supplied to the carbon electrodes of the furnace. Slag and ferrophosphorus are withdrawn from the hearth of the furnace 3, and the gaseous mixture of phosphorus reduction furnace gas, comprised of phosphorus and carbon monoxide, is withdrawn from the top of furnace 3. Phosphate rock is charged into the top of shaft furnace 4, and is heated to the point of fusion of calcium metaphosphate, but below the temperature at which calcium pyrophosphate melts, by admitting the phosphorus reduction furnace gas from furnace 3; by admitting only a sufficient amount of air supplied by blower 6, to oxidize the phosphorus and a small proportion of the carbon monoxide in the gas from the electric furnace 2; and by admitting only a sufficient amount of inert gas supplied by blower 8, to maintain the temperature of the combustion products sufficiently below the melting point of calcium pyrophosphate to prevent any substantial contamination of the calcium metaphosphate formed, to a plurality of burners in the shaft furnace 4, at an elevation immediately above the hearth of the furnace. The melt produced in blast furnace 4, which is comprised substantially of calcium metaphosphate, is withdrawn from the hearth of shaft furnace 4, and a gaseous mixture, which is a fuel gas comprised of carbon monoxide and carbon dioxide, is withdrawn from near the top of shaft furnace 4, by blower 10, which serves to maintain a substantially atmospheric pressure at the top of electric furnace 3. A portion of the fuel gas delivered by blower 10, is used to supply the inert gas to blower 8.

It is evident that there are numerous factors which will influence conditions for the most satisfactory operation of my invention, the actual limits of which cannot be established except by detailed study of each set of raw materials and the intermediate and finished products involved.

The source of the elemental phosphorus may be either a phosphorus reduction furnace gas, or elemental phosphorus alone, which has been produced by any means, such as by separation of the elemental phosphorus from a phosphorus reduction furnace gas.

The phosphorus reduction furnace gas may be produced in any suitable unit for the reduction of a phosphatic charge. The phosphorus reduction furnace gas from a blast furnace contains 0.7 to 1.0% elemental phosphorus and 35 to 40% carbon monoxide, while the phosphorus reduction furnace gas from an electric furnace contains 8.5 to 9.5% elemental phosphorus and 75 to 85% carbon monoxide. All of the elemental phosphorus in the gas and a portion of the carbon monoxide is oxidized by mixing the phosphorus reduction furnace gas with the required amount of air, which may be preheated, if so desired. The extent to which the carbon monoxide is oxidized depends upon the heat required in the particular instance to fuse the calcium metaphosphate formed.

Any calcium-containing material, which is reactive with phosphorus pentoxide to form calcium metaphosphate and which has a melting point above the melting point of calcium metaphosphate, may be used. It has been found preferable to use phosphate rock, lime or limestone as the source of the calcium-containing material. In carrying out the reaction in the shaft furnace it is preferable to have the screened lump material of such size that it passes through a screen with 2" openings.

The inert gas, which is admitted either before or after the combustion of the phosphorus, may be derived from any suitable source. This inert gas may comprise carbon monoxide, carbon dioxide, nitrogen or air, or mixtures of the same, depending upon the nature of the material being oxidized. A substantially inert gas, such as flue gas, which contains an appreciable proportion of oxygen, may be used, thereby reducing the air requirement as a means of supplying the oxygen required for the combustion of the phosphorus. In those instances in which the phosphatic material is reduced in the blast furnace to form the phosphorus reduction furnace gas, and under those circumstances in which it may be found desirable to preheat the air used for the oxidation of a portion of the reduction furnace gas, the essential features of the process disclosed in my copending application Serial Number 34,926, filed August 6, 1935, may be used in order that a fuel gas of sufficiently high calorific value may result for use in heat regenerators for the purpose of preheating the required amount of air. Under these circumstances, it is preferable to use a portion of this fuel gas as the source of the inert gas used to lower the temperature of the combustion products in the reaction zone in order that the gaseous products removed or withdrawn from near the top of the shaft furnace will be of sufficiently high calorific value to serve as a fuel gas. When elemental phosphorus alone is oxidized, air may be used as the source of the inert gas, since it will effectively lower the flame temperature of the combustion products in the absence of combustible materials other than the elemental phosphorus.

It will be seen, therefore, that this invention actually may be carried out by the modification of certain details without departing from its spirit or scope.

I claim:

1. Continuous process of making calcium metaphosphate from limestone and elemental phosphorus, which comprises charging the limestone into the top of a shaft furnace; oxidizing phosphorus reduction furnace gas with a limited amount of air, the amount of air being at least sufficient to oxidize all of the elemental phosphorus to phosphorus pentoxide; mixing the products of combustion with a separate current of inert gas, the amount of the inert gas being that required to lower the flame temperature of the products of combustion of the phosphorus reduction furnace gas to a temperature substantially above the melting point of the calcium metaphosphate subsequently formed and below the melting point of calcium pyrophosphate; contacting the charge in the shaft furnace with the mixture of the products of combustion of the phosphorus reduction furnace gas and the inert gas; withdrawing the gaseous products from near the top of the shaft furnace; supplying a portion of the gaseous products so withdrawn as the source of the inert gas for lowering the temperature of the products of partial combustion of the phosphorus reduction furnace gas; and withdrawing the fused calcium metaphosphate from the bottom of the shaft furnace.

2. Continuous process of making calcium metaphosphate from limestone and elemental phosphorus, which comprises charging the limestone into the top of a shaft furnace; oxidizing phosphorus reduction furnace gas with a limited amount of air, the amount of air being at least sufficient to oxidize all of the elemental phosphorus to phosphorus pentoxide; mixing the products of combustion with a separate current of inert gas, which is this gaseous mixture after substantially all of the phosphorus pentoxide contained therein has been subsequently removed, the amount of the inert gas being that required to lower the flame temperature of the products of combustion of the phosphorus reduction furnace gas to a temperature substantially above the melting point of the calcium metaphosphate subsequently formed and below the melting point of calcium pyrophosphate; contacting the charge in the shaft furnace with the mixture of the products of combustion of the phosphorus reduction furnace gas and the inert gas; and withdrawing the fused calcium metaphosphate from the bottom of the shaft furnace.

3. Continuous process of making calcium metaphosphate from limestone and elemental phosphorus, which comprises oxidizing the elemental phosphorus with an amount of air sufficient to oxidize the elemental phosphorus; mixing the products of combustion with a separate current of inert gas, which is this gaseous mixture after substantially all of the phosphorus pentoxide contained therein has been subsequently removed, the amount of inert gas being that required to lower the flame temperature of the products of combustion of the elemental phosphorus to a temperature substantially above the melting point of the calcium metaphosphate subsequently formed and below the melting point of calcium pyrophosphate; and contacting the limestone in a shaft furnace with a mixture of the products of combustion of the elemental phosphorus and the inert gas.

4. Continuous process of making calcium metaphosphate from phosphate rock and elemental phosphorus, which comprises charging the phosphate rock into the top of a shaft furnace; oxidizing phosphorus reduction furnace gas with a limited amount of air, the amount of air being at least sufficient to oxidize all of the elemental phosphorus to phosphorus pentoxide; mixing the products of combustion with a separate current of inert gas, the amount of the inert gas being that required to lower the flame temperature of the products of combustion of the phosphorus reduction furnace gas to a temperature substantially above the melting point of the calcium metaphosphate subsequently formed and below the melting point of calcium pyrophosphate; contacting the charge in the shaft furnace with the mixture of the products of combustion of the phosphorus reduction furnace gas and the inert gas; withdrawing the gaseous products from near the top of the shaft furnace; supplying a portion of the gaseous products so withdrawn as the source of the inert gas for lowering the temperature of the products of partial combustion of the phosphorus reduction furnace gas; and withdrawing the fused calcium metaphosphate from the bottom of the shaft furnace.

5. Continuous process of making calcium metaphosphate from phosphate rock and elemental phosphorus, which comprises charging the phosphate rock into the top of a shaft furnace; oxidizing phosphorus reduction furnace gas with a limited amount of air, the amount of air being at least sufficient to oxidize all of the elemental phosphorus to phosphorus pentoxide; mixing the products of combustion with a separate current of inert gas, which is this gaseous mixture after substantially all of the phosphorus pentoxide contained therein has been subsequently removed, the amount of the inert gas being that required to lower the flame temperature of the products of combustion of the phosphorus reduction furnace gas to a temperature substantially above the melting point of the calcium metaphosphate subsequently formed and below the melting point of calcium pyrophosphate; contacting the charge in the shaft furnace with the mixture of the products of combustion of the phosphorus reduction furnace gas and the inert gas; and withdrawing the fused calcium metaphosphate from the bottom of the shaft furnace.

6. Continuous process of making calcium metaphosphate from phosphate rock and elemental phosphorus, which comprises oxidizing the elemental phosphorus with an amount of air sufficient to oxidize the elemental phosphorus; mixing the products of combustion with a separate current of inert gas, which is this gaseous mixture after substantially all of the phosphorus pentoxide contained therein has been subsequently removed, the amount of the inert gas being that required to lower the flame temperature of the products of combustion of the elemental phosphorus to a temperature substantially above the melting point of the calcium metaphosphate subsequently formed and below the melting point of calcium pyrophosphate; and contacting the phosphate rock in a shaft furnace with the mixture of the products of combustion of the elemental phosphorus and the inert gas.

7. Continuous process of making calcium metaphosphate from a calcium bearing mineral, which is reactive with phosphorus pentoxide to form calcium metaphosphate and which melts at a temperature above the melting point of calcium metaphosphate, and elemental phosphorus, which comprises mixing the products of combustion of the elemental phosphorus with a separate current of inert gas, which is this gaseous mixture after substantially all of the phosphorus pentoxide contained therein has been subsequently removed, the amount of the inert gas being that required to lower the flame temperature of the products of combustion of the elemental phosphorus to a temperature substantially above the melting point of the calcium metaphosphate subsequently formed and below the melting point of calcium pyrophosphate; and contacting the calcium-bearing mineral with the phosphorus pentoxide contained in the mixture of the products of combustion of elemental phosphorus and the inert gas in a shaft furnace.

8. Step in the continuous process of making calcium metaphosphate from a calcium-bearing material, which is reactive with phosphorus pentoxide to form calcium metaphosphate and which melts at a temperature above the melting point of calcium metaphosphate, and elemental phosphorus, in which the calcium-bearing material is contacted with a gaseous mixture containing phosphorus pentoxide, which comprises mixing the products of combustion of elemental phosphorus with a separate current of inert gas, which is this gaseous mixture after substantially all of the phosphorus pentoxide contained therein has been subsequently removed, with the amount of the inert gas being that required to lower the flame temperature of the mixture of the gaseous combustion products to a temperature substantially above the melting point of the calcium metaphosphate subsequently formed and below the melting point of calcium pyrophosphate.

HARRY A. CURTIS.